United States Patent [19]

Smith

[11] Patent Number: 4,667,624
[45] Date of Patent: May 26, 1987

[54] SAFETY HARNESS FOR CHILDREN

[76] Inventor: Dorothy Smith, 3605 W. Melvina St., Milwaukee, Wis. 53216

[21] Appl. No.: 853,387

[22] Filed: Apr. 17, 1986

Related U.S. Application Data

[63] Continuation of Ser. No. 682,289, Dec. 17, 1984, abandoned.

[51] Int. Cl.$^4$ .............................................. A01K 29/00
[52] U.S. Cl. ..................................................... 119/96
[58] Field of Search .................................. 119/96, 109

[56] References Cited

U.S. PATENT DOCUMENTS

| | | |
|---|---|---|
| D. 256,850 | 9/1980 | Donahue . |
| 579,818 | 3/1897 | Cooley . |
| 1,310,958 | 7/1919 | O'Connor . |
| 1,551,932 | 9/1925 | Carver ................................... 119/96 |
| 2,212,746 | 8/1940 | Nunn ...................................... 119/96 |
| 2,233,397 | 3/1941 | Bloom .................................... 119/96 |
| 2,275,983 | 3/1942 | Nadeau . |
| 2,568,304 | 9/1951 | Schoenbrun ......................... 119/96 |
| 2,661,888 | 12/1953 | Sidlinger ............................... 119/96 |
| 3,077,292 | 2/1963 | Gehrke .................................. 119/96 |
| 3,088,438 | 5/1963 | Oliphant . |
| 3,295,501 | 1/1967 | Riley ..................................... 119/96 |
| 3,295,501 | 1/1967 | Riley . |
| 3,480,275 | 11/1969 | Jernstrom et al. . |
| 3,769,938 | 11/1973 | Hudziak et al. . |
| 4,214,382 | 7/1980 | Matsutani . |

Primary Examiner—Robert P. Swiatek
Attorney, Agent, or Firm—Quarles & Brady

[57] ABSTRACT

A harness is disclosed that joins a child to a companion by means of an inelastic strap. The strap is joined at one end by a snap hook to one of a plurality of rings spaced along an adult's waistband. At the other end, the strap has a snap hook that connects to a pair of rings each connected to a respective one of a pair of crossing shoulder straps on a child's harness. The shoulder straps are attached to a waistband having a clasp to be positioned at the rear of the child and the straps cross across the back of the child. The harness, waistband and strap are all formed of a woven fabric.

1 Claim, 4 Drawing Figures

U.S. Patent   May 26, 1987   4,667,624
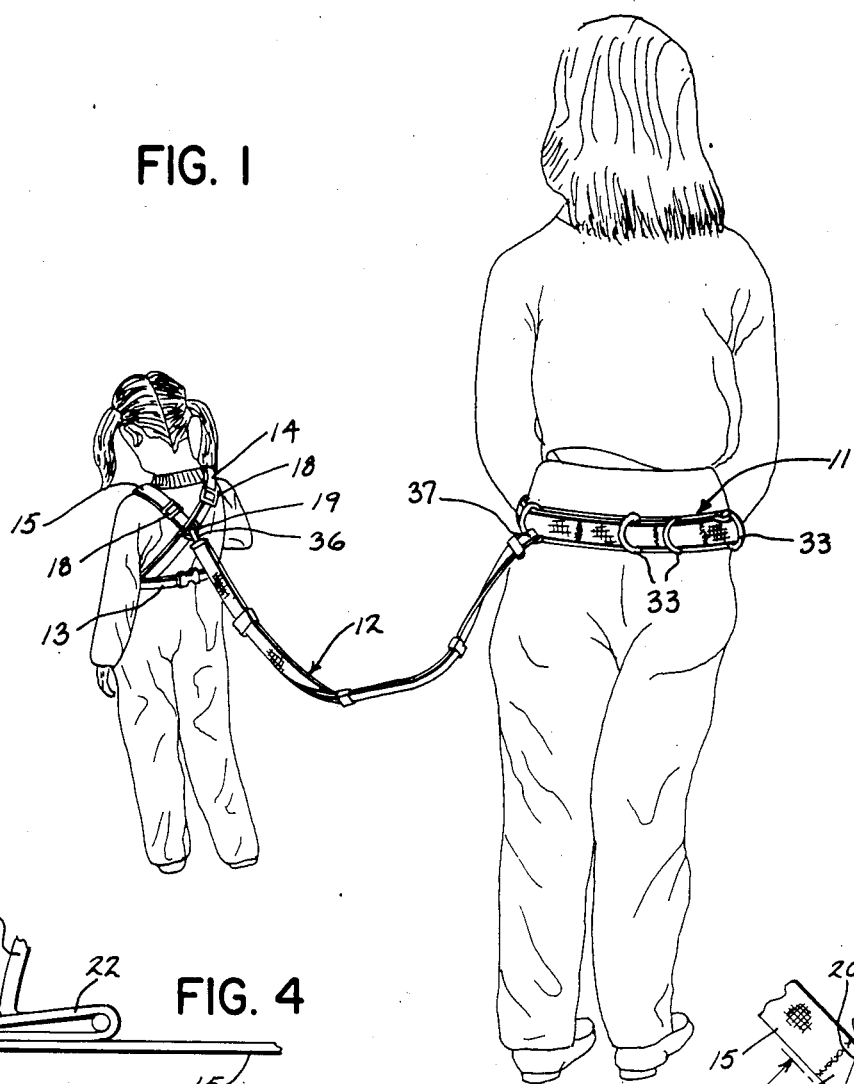
FIG. 1
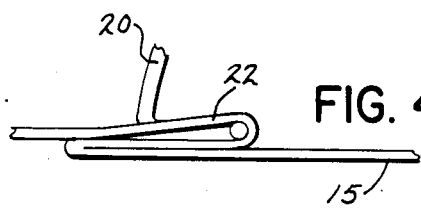
FIG. 4
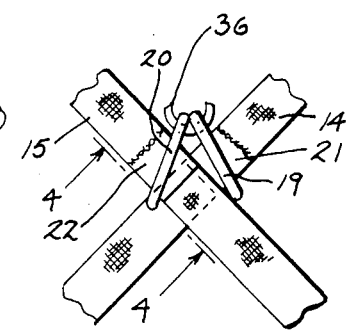
FIG. 3
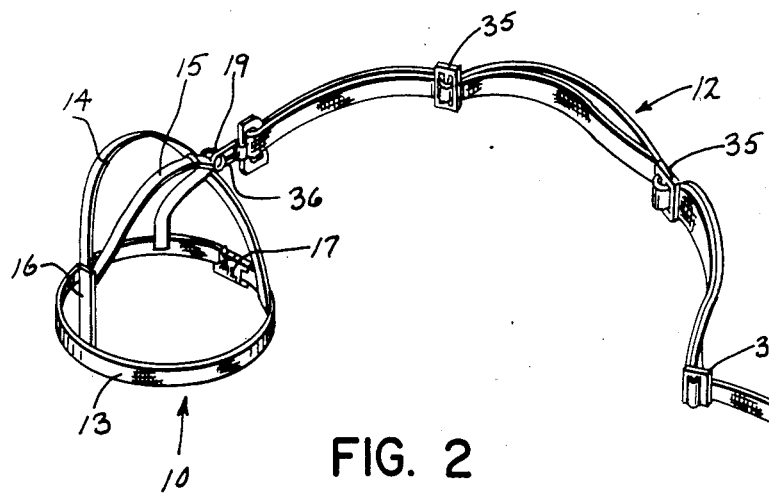
FIG. 2
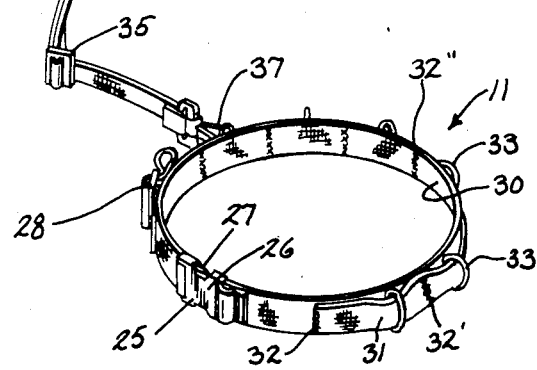

SAFETY HARNESS FOR CHILDREN

This application is a continuation of application Ser. No. 682,289, filed 12/17/84, now abandoned.

BACKGROUND OF THE INVENTION

This invention relates to a harness for children, and particularly to a harness which physically joins the child to a belt worn about the waist of the parent or companion.

Children beyond the age of toddlers often need close supervision in situations in which it is difficult for the parent, guardian or companion of the child to exercise control. This is particularly true in both crowded areas such as shopping malls, or carnivals, and in open areas such as parks, or in any number of other places where the child has both the inclination and the opportunity to wander off from his or her adult companion. The time honored approach to maintaining control over the child has been to simply grasp the hand of the child and to hold on tightly. This can be most difficult and tiring both for the adult companion and child particularly if there is a very large difference in their heights. Another approach has been to place a harness on the child with a leash connected to the harness and grasped in the hand of the adult companion. A struggling child can often cause parents to lose their grip on the leash, and the leash is viewed by society as being somehow cruel or demeaning to the child because it is reminiscent of treating the child as one would an animal pet.

I have developed a safety harness for children which is not demeaning to the child in that both the child and his or her parent or adult companion wears a portion of the safety harness. At the same time, the safety harness affords positive security by physically linking the child to the parent or companion.

SUMMARY OF THE INVENTION

In accordance with the invention I provide a safety harness for children that includes an adult waist belt which has a releasable clasp and a plurality of rings spaced along the belt, a harness for attachment about the upper torso of a child and including a waistband and shoulder straps that cross at the back of the child with ring means at the crossed shoulder straps, and a connecting strap releasably attached at its ends to the ring means of the harness and one of the rings of the belt.

In the preferred embodiment, the adult waist belt is adjustable and the rings of the belt are attached by a flexible strip which is sewn at spaced points along the belt. The waist belt rings provide multiple points of attachment of the connecting strap and also allow more than one child to be attended by a single adult. The connecting belt has a snap ring at each end for quick connection and removal from the respective rings of the harness and waist belt, and the connecting strap is adjustable in length. The shoulder straps and waistband of the harness are adjustable. The shoulder straps each have a ring and the rings of both shoulder straps are held in a snap ring of the connecting strap to thereby join the shoulder strap together. The harness, belt and connecting strap are all preferably formed of a woven fabric material.

It is a principal objective of the invention to provide a safety harness which physically links a child with an adult companion.

It is also an objective of the invention to provide such a safety harness which is mounted on the torso of the child in such a manner that the child cannot remove it.

It is yet another objective of the invention to provide such a safety harness in which more than one child at a time can be joined to an adult companion.

The foregoing and other objectives and advantages of the invention will appear in the detailed description which follows. In the description reference is made to the accompanying drawing which illustrates a preferred embodiment of the invention.

BRIEF DESCRIPTION OF THE DRAWINGS

FIG. 1 is a view in perspective illustrating the use of the safety harness for connection of a child to an adult companion;

FIG. 2 is another view in perspective of the safety harness by itself;

FIG. 3 is a partial view in elevation of the crossed shoulder straps of the child's harness; and FIG. 4 is an enlarged view in section taken in the plane of the line 4—4 of FIG. 3.

DETAILED DESCRIPTION OF THE PREFERRED EMBODIMENT

Referring to the drawings, the safety harness generally includes a harness 10 for attachment about the upper torso of a child, a belt 11 for attachment about the waist of an adult, and a connecting strap 12. The harness 10 includes a waistband 13 and shoulder straps 14 and 15 attached at the front of the child to an upright strap 16 that is connected to the waistband 13. The shoulder straps 14 and 15 cross at the back of the child but are not joined together where they cross. The shoulder straps 14 and 15 are attached at the rear of the child to the waistband 13 at positions on either side of a central, rear clasp 17. Both shoulder straps 14 and 15 include buckles 18 to allow for adjustment of the length of the shoulder straps. The clasp 17 has cooperating male and female members that allow detachment of the clasp and separation of the ends of the waistband 13. The clasp 17 also allows for adjustment of the length of the waistband 13. Rigid rings 19 and 20 are each loosely attached in a loop 21 and 22 in the crossed straps 14 and 15, respectively. As shown in FIG. 1, the harness 10 is worn on the child with the clasp 17 at the back of the child and the rings 19 and 20 located at the back of the child and in close proximity to each other. The waistband and straps of the harness 10 are preferably made from a flexible woven fabric, and the loops 21 and 22 are formed by doubling the fabric and sewing the doubled fabric (see FIGS. 3 and 4).

The belt 11 has a clasp 25 that also includes a male member 26 and a female member 27 which may be released from each other to free the ends of the belt 11. The belt 11 may also have a buckle 28 that allows adjustment of the length of the belt. The belt 11 is formed of a base band 30 of a woven fabric strapping and a second flexible strap 31 is sewn to the base portion 30 at spaced positions 32, 32', 32", etc., along the length of the belt 11. Rigid rings 33 are loosely held on the flexible strap 31 between the points of attachment 32, 32', 32" etc.

The connecting strap 12 is also formed of a woven fabric strapping and includes double layers of such strapping threaded through buckles 35 at spaced positions so that the length of the strap 12 may be adjusted. Snap hooks 36 and 37 are attached to the respective ends of the connecting strap 12 for releasable engagement with the rings 19 and 20 of the harness 10 and one of the rings 33 of the adult belt 11. The snap hook 36 joins together the crossed shoulder straps 14 and 15 and securely fits the harness 10 to the child. The connecting strap 12 is inelastic so that the child cannot stretch the distance from the companion.

As can be seen from the drawings and appreciated from the above description, a harness in accordance with this invention physically joins the child to the adult companion. The companion has his or her hands free. There is no danger that the two will be separated in a crowd or that the child will wander away. As will be readily apparent, the plurality of rings 33 on the adult belt 11 allow for the attachment of several harnesses 10 and connecting straps 12 to a single adult companion so that a parent or guardian with more than one child can connect the children to the single waist belt 11.

All of the elements are adjustable to accommodate the sizes of the wearers and to vary the distance between the child and the adult companion. The harness attaches to the child in such a way that the child is unable to remove it without assistance because the shoulder straps cross in the rear and that is a point of attachment to the adult and also because the removable clasp 17 is located in the rear. Even though the child might accidently be able to open the clasp 17, the shoulder straps 14 and 15 will remain about the upper torso of the child until such time as the adult can readjust and position the harness.

I claim:
1. A safety harness for children, comprising:
   an adjustable length belt for attachment about the waist of an adult, said belt including a clasp, a flexible strip disposed along the length of the belt and secured to the belt at spaced points, and a plurality of rigid rings spaced along the belt with each ring being attached about the flexible strip between adjacent points of securement;
   a harness for attachment about the upper torso of a child, said harness including shoulder straps that cross at the back of the child, a waistband with a clasp located at the back of the child, and a rigid ring attached to each of the crossed shoulder straps, said shoulder straps and waistband being each adjustable in length; and
   a connecting strap releasably attached at its ends to the two rings of the shoulder straps of the harness and to one of the rings of the belt, said connecting strap being adjustable in length and having snap hooks at each end for attachment to the rings.

* * * * *